2,794,717

FUEL ANTIKNOCK

Lewis F. Gilbert, Detroit, Mich., assignor to Ethyl Corporation, New York, N. Y., a corporation of Delaware No Drawing. Application July 30, 1953,
Serial No. 371,400

17 Claims. (Cl. 44—69)

This invention relates to the improvement of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvantage particularly during storage, handling and blending operations, namely their inherent instability. Thus, tetraethyllead and related compounds are susceptible of deterioration which is largely dependent upon the nature of the environment. For example, it has been found that organolead antiknock agents and antiknock fluids containing the same when in contact with certain metals such as copper and copper-containing alloys tend to deteriorate even in a reducing atmosphere. Such deterioration is postulated to result from an adverse catalytic activity exhibited by such metals. In other words, it is generally believed that copper and like metals act as self-perpetuating decomposition accelerators. Another condition enhancing the deterioration of such anti-knock agents is contact with air. It is generally believed that atmospheric constituents notably oxygen and ozone, tend to oxidize one or more of the lead-to-carbon bonds with the formation of insoluble decomposition products. Under these conditions there contemporaneously occurs a color change in the dyestuff normally present in anti-knock fluids such that the visual identification of the product frequently becomes difficult if not impossible. Organolead antiknock agents are likewise decomposed on exposure to strong light, particularly sunlight. In this case the decomposition is attributed to the catalytic decomposition of the organolead compounds by ultra-violet light. It is apparent, therefore, that the exposure of tetraethyllead and tetraethyllead-containing compositions to any or all of the above environments results in a number of operational difficulties including loss of antiknock effectiveness, the formation of sludge and other types of sediment and the like.

When organolead-containing compositions are utilized in internal combustion engines other difficulties are frequently encountered. For example, in spite of the high degree of efficiency of the normal scavenger complement in antiknock fluids, the accumulation of engine deposits in the engine cannot be entirely presented. Such deposition is particularly prevalent when spark ignition engines are operated under conditions of low speed and light load such as encountered in metropolitan driving conditions. As a result of notable improvements in fuel anti-knock quality which have been made in recent years, such deposits present but a few minor problems in low compression engines. However, because of the trend in the automotive industry of utilizing high compression engines in passenger cars and trucks, the accumulation of deposits results in a number of relatively serious problems including increased detonation, deposit-induced autoignition or wild ping, spark plug fouling, reduction in exhaust valve life, and the like.

Of the problems previously enumerated, those of wild ping, spark plug fouling and reduced exhaust valve life are of considerable concern to the automotive industry. This results from the fact that each time the lead concentration in the fuel is raised to coincide with increases in compression ratio to eliminate detonation the magnitude of one or more of these problems generally increases. As a result, there is a paramount need existing for a new and improved method for altering the physical and chemical characteristics of deposits and for modifying the combustion process such that the well known detrimental effects of the previously described deposit-induced engine phenomena can be marked by suppressed or be eliminated.

It is, therefore, an object of the present invention to provide adjuvants for organolead compounds. It is likewise an object of this invention to provide means of improving compositions containing organolead antiknock agents such as antiknock fluids and fuels. Similarly, the provision of improved organolead compositions is another object of this invention. A particular object of this invention is to provide improved tetraethyllead and tetraethyllead-containing antiknock fluids. In addition, an object of this invention is to provide methods of improving antiknock fluids such that during compound, storage and blending operations such materials are stabilized against the adverse effects of deteriorative environments. An additional object of the instant invention is to provide means of obviating deposit-induced engine phenomena of the character described hereinbefore. Other important objects of this invention will be apparent from the discussion hereinafter.

It has now been found that the above and other objects of this invention are attained by providing compositions of matter adapted for use as additives to fuel for spark fired internal combustion engines comprising an organolead antiknock agent and, in quantity sufficient to stabilize or improve said agent, a phosphorus sesquichalcogen. Such phosphorus compounds are those which contain phosphorus and an element of the chalcogen family, namely sulfur, selenium and/or tellurium. In other words, as used in the discussion hereinafter, the term phosphorus sesquichalcogen encompasses the phosphorus compounds containing both phosphorus and one or more elements of group VI–A of the periodic table having an atomic number from 16 to 52, or a mixture of such compounds. Therefore, the elements which are combined with phosphorus in the phosphorus sesquichalcogens are selected from the group consisting of sulfur, selenium, and tellurium. Hence, the phosphorus sesquichalocogens utilized as organolead adjuvants in accordance with this invention can be represented by the general formula $P_4A_3$ wherein A is sulfur, selenium or tellurium or mixtures thereof. Of such compounds phosphorus sesquisulfide, $P_4S_3$; phosphorus sesquiselenide, $P_4Se_3$; and mixtures thereof constitute preferred embodiments. Furthermore, because of its overall enhanced properties and ready availability phosphorus sesquisulfide represents the preferred organolead adjuvant of this invention. This compound is characterized by the presence of a plurality of phosphorus-to-sulfur bonds which, as will become apparent from the discussion hereinafter, impart to the compound physical characteristics such as solubility in organic media, stability against deterioration, and compatibility with the chemical entities with which it comes in contact. In addition to this, such multiple phosphorus-to-sulfur bonds enable the compound to be readily inducted into an internal combustion engine contrary to expectations. However, the greatest significance resulting from the plurality of phosphorus-to-sulfur bonds resides in the fact that the compound exhibits superior effectiveness with regard to many of the problems enumerated hereinbefore over that attributable to phosphorus compounds proposed in the prior art.

The organolead antiknock agent utilized in the compositions of matter of the present invention consists of an organolead compound in which lead is directly bonded to carbon atoms. Such compounds are exemplified by the lead aryls such as tetraphenyllead, and the lead alkyls such as tetramethyllead, tetraethyllead, tetrapropyllead, tetrabutyllead, diethyldimethyllead, methyltriethyllead and the like as well as mixtures of such compounds. Because of the generally superior characteristics of tetraethyllead and the ready accessibility thereof as an article of commerce, it constitutes a preferred embodiment of the organolead antiknock agent utilized in accordance with this invention.

With the various compositions within the scope of the present invention the proportion of phosphorus sesquichalcogen utilized in conjunction with an organolead compound is such that there is a total of from between about 0.005 to 0.5 theory of phosphorus. In this regard a theory of phosphorus is defined as the amount of phosphorus theoretically required to react with the lead to form lead ortho phosphate which quantity is two atoms of phosphorus per three atoms of lead. However, generally speaking, it is sufficient to employ an amount of phosphorus between about 0.05 and about 0.3 theory of phosphorus with the best overall results being obtained with amounts of about 0.1 to about 0.2 theory of phosphorus. The last mentioned concentrations constitute a preferred embodiment of this invention.

Regarding many of the problems frequently associated with high octane quality fuel, an anomalous situation obtains. On one hand an effective adjuvant for organolead compounds should possess stability against deterioration in common environments, compatibility with the chemical entities with which it comes in contact, and volatility so as to possess the characteristic frequently referred to as engine industibility. On the other hand, the mere selection of a phosphorus compound to acquire the optimum characteristics enumerated above does not necessarily assure the effectiveness of the compound in combatting such phenomena as spark plug fouling, wild ping, and the like. It is entirely probable that some empirical relationship between physical properties and effectiveness in the obviation of such problems exists, but as yet the state of the art does not contain a satisfactory relationship of this type. However, phosphorus sesquichalcogens such as phosphorus sesquisulfide, phosphorus sesquiselenide, phosphorus sesquitelluride, and mixtures thereof possess the requisite physical properties adapting them for use as organolead adjuvants and at the same time possess the inherent capability of being extremely effective in obviating engine problems of the type described hereinbefore.

It will be apparent that there exists a number of variations in employing the adjuvants of this invention. For example, a facet of this invention involves the provision of a mixture of an organolead antiknock agent such as a lead alkyl and phosphorus sesquichalcogen. In such a case the resulting composition is enhanced from the standpoint of oxidative stability. That is to say, the presence of a phosphorus sesquichalcogen such as phosphorus sesquisulfide in an amount as described hereinbefore in a lead alkyl affords a significant degree of protection against the deleterious effects of oxidative deterioration. In preparing such compositions, it has been found advantageous to employ a mutual solubilizing agent so as to assure the provision of a homogeneous fluid composition.

Such compositions can be blended with hydrocarbon fuel of the gasoline boiling range to provide improved fuel compositions, which under certain circumstances do not require the utilization of organic halogen-containing material as a scavenger. It is believed that under these conditions the presence of both phosphorus and a group VI–A element having an atomic number from 16 to 52 contribute sufficient scavenging action such that the amount of deposition in the engine is suitably controlled.

Of perhaps more practical importance is a second variant of this invention, namely the utilization of phosphorus sesquichalcogen in organolead-containing antiknock fluids. It is well known in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion such antiknock fluids likewise contain minor proportions of diluents, antioxidants, metal deactivators and the like. In line with the foregoing, therefore, a preferred embodiment of this invention involves providing improved antiknock fluids containing the requisite concentration of any of the above-described phosphorus compounds. As indicated hereinbefore, in preparing such improved antiknock fluids it is efficacious to employ a solubilizing agent such as a petroleum cut or fraction, a coal tar fraction, or indeed any of the well known organic solubilizing agents. However, such improved antiknock fluids generally do not require the presence of a stabilizer since the adjuvants of this invention impart a considerable degree of stabilization to the fluid.

Still another variant of the present invention consists of providing improved fuel compositions. These normally consist of hydrocarbons of the gasoline boiling range containing minor proportions of the aforesaid antiknock fluids of the present invention. It will be appreciated that the quantity of the antiknock fluid of the present invention utilized in my improved fuel compositions is primarily contingent upon the use for which gasoline is intended. That is to say, when the fuel is intended for use in automotive engines such as passenger cars, trucks, buses and the like, an amount of any of my improved antiknock fluids equivalent to a lead content in the gasoline of from between about 0.53 and about 3.17 grams of lead per gallon is satisfactory. Thus, in the embodiments of this invention wherein I employ tetraethyllead as an antiknock agent such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of this invention are utilized in fuel for aviation engines, somewhat higher concentrations are employed. Generally speaking, amounts of lead up to about 6.34 grams of lead per gallon can be utilized although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated previously, in all of the compositions of the present invention the amount of phosphorus is fixed within the limits above described. Thus, in the preferred embodiments of this invention there is present an amount of a phosphorus sesquichalcogen such that there is from about 0.1 to about 0.2 theory of phosphorus.

In preparing the improved fuel compositions of this invention it is usually necessary only to add the requisite quantity of the improved fluid to the fuel and by means of stirring, shaking or other means of physical agitation, homogeneous fuel compositions are provided. Although the simplest means of preparing such fuels is to blend therewith the necessary quantity of improved antiknock fluid of this invention, it is possible and indeed frequently advantageous to add a conventional antiknock fluid to the fuel and subsequently blend therewith the necessary quantity of a compound selected from the group consisting of phosphorus sesquisulfide, phosphorus sesquiselenide, and phosphorus sesquitelluride as well as mixtures of such materials. In addition to reversing this order of addition of conventional antiknock fluids and phosphorus sesquichalcogen, another variant within the purview of this invention is to blend with the fuel each of the individual constituents of my antiknock fluids separately.

To illustrate the effectiveness of improved antiknock fluids of the present invention consideration was given to the problem of wild ping. In order to do this, recourse was made to the following general test procedure utilizing a single cylinder CFR knock test engine equipped with an L-head cylinder and a wild ping counter which records the total number of wild pings which have occurred during the test periods. Such apparatus includes an extra spark plug used as an ionization gap which is installed in a second opening in the combustion chamber. A mechanical breaker switch driven at camshaft speed is also provided which, when closed, makes the wild ping counter ineffective for the duration of the normal flame in the combustion chamber. The breaker is open for 80 crankshaft degrees between 70° BTC (before top dead center) and 10° ATC (after top dead center). If a flame front induced early in the cycle by deposits reaches the ionization gap during this open period, the counter registers a wild ping regardless of the audible manifestations. During normal combustion with ignition timing at TDC (top dead center), the flame front reaches the ionization gap 15 to 18° ATC during the period wherein the points are closed and no count is made.

The actual test procedure consists essentially of operating the test engine initially having a clean combustion chamber under relatively mild cycling conditions for deposit formation until an equilibrium with regard to deposit-induced autoignition is reached. The effect of fuels treated in accordance with the instant invention is determined by comparing the test results obtained using the fuel treated with an improved antiknock fluid of this invention with those obtained using a fuel treated with a conventional antiknock mixture. Since the wild ping counter records the total number of wild pings which have occurred during the test procedures a quantitative expression for the amount of deposit-induced autoignition is the number of wild pings per hour of operation.

The effectiveness of the improved compositions of the present invention in the abatement of deposit-induced autoignition will be apparent from the following specific examples.

*Example I*

To 100 gallons of a commercially available blend of straight run, catalytically cracked and polymer blending stocks was added and thoroughly mixed 300 milliliters of tetraethyllead as an antiknock fluid comprising tetraethyllead, 0.5 theory of bromine as ethylene dibromide and 1.0 theory of chlorine as ethylene dichloride. The resulting homogeneous fuel composition was then subjected to the above-described engine test procedure so as to formulate a base line of wild ping with a conventional fuel. It was found that there were 135 wild pings per hour of engine operation.

*Example II*

An improved antiknock fluid of the present invention was prepared by adding 0.1 theory of phosphorus as phosphorus sesquisulfide to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing these components. The entire quantity of improved antiknock fluid so prepared was added to 50 gallons of a commercially available blend of straight run, catalytically cracked and polymer blending stocks. Upon mechanically agitating the resulting mixture a homogeneous fuel composition was prepared. The laboratory single cylinder test engine as described hereinbefore was then operated on this fuel composition while contemporaneously determining the rate of wild pings as detected by the wild ping counter. It was found that the utilization of an improved antiknock fuel of the present invention produced 39 wild pings per hour as contrasted with a conventional fuel which produced 135 wild pings per hour. Consequently, an improved fuel composition of this invention resulted in a reduction of wild ping of 71 percent.

The preceding examples are merely illustrative of the beneficial effects produced by the improved organolead-containing compositions of the instant invention. Comparable effectiveness is similarly obtained when other improved compositions of this invention are utilized for the attainment of the objectives as set forth hereinbefore. For example, comparable effectiveness regarding reduction in wild ping rate is obtained when phosphorus sesquiselenide, phosphorus sesquitelluride and mixtures of either or both of these materials with phosphorus sesquisulfide are utilized as organolead adjuvants in line with this invention. Without desiring to be bound by the following explanation regarding the enhanced effectiveness of the adjuvants of this invention, a tenable explanation apparently involves a proper balance between physical properties such as stability, volatility, solubility, compatibility, and the like, and the energy relationships or ease of decomposition which may attribute to the overall effectiveness of the compounds by facilitating decomposition at the proper instant in the engine test cycle.

The totally unexpected enhanced effectiveness brought about by the utilization of phosphorus sesquichalcogen as organolead adjuvants is still further illustrated by comparing their effectiveness on wild ping with that of a phosphorus compound suggested in the prior art. This compound is characterized by the presence of a plurality of phosphorus-to-oxygen bonds whereas, as indicated previously, the phosphorus sesquichalcogens are characterized by the presence of phosphorus-to-chalcogen bonds. For example, it was found that the effectiveness on the minimization of wild ping produced by 0.1 theory of phosphorus as phosphorus sesquisulfide was of a greater magnitude than a comparable concentration of phosphorus in the form of phosphorus-to-oxygen bonds as suggested by the prior art.

The superior effectiveness of a preferred embodiment of this invention, namely phosphorus sesquisulfide in the diminution of deposit-induced engine problems is further unexpected when considering the constituents which make up its chemical structure. On the one hand, both sulfur and phosphorus compounds have heretofore been judiciously avoided as much as possible in fuel because of their notorious deleterious effects particularly in the realm of organolead antagonism and the like. In the case of sulfur, for example, refiners have long been resorting to various means of removing sulfur from hydrocarbons of the gasoline boiling range because of its recognized deleterious effects on antiknock activity, engine cleanliness, storage stability and the like. However, the adjuvant of this invention possessing solely phosphorus and sulfur does not bring about such deleterious effects. On the other hand another surprising effect has been noted, namely the fact that the presence of phosphorus-to-sulfur bonds produces a greater effectiveness regarding wild ping than that exhibited by compounds possessing either phosphorus or sulfur and likewise a mixture of phosphorus- and sulfur-containing compounds. That fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of 1 theory of ditertiary butyl disulfide, 2 theories of dibutyl sulfide, and 2 theories of thiophene, a mixture representative of the average sulfur constituents of petroleum hydrocarbon fuel, to a conventional gasoline containing 3 milliliters of tetraethyllead per gallon resulted in a wild ping rate of 93 wild pings per hour. In contrast, the same fuel containing the same concentration of tetraethyllead produced 74 wild pings per hour. Thus, the incorporation of sulfur-containing compounds different from the sulfur-containing adjuvant utilized in the present invention resulted in a wild ping rate amounting to 125 percent of the base line. That is to say, the presence of sulfur-containing compounds generally increase the rate of wild ping whereas the presence of a considerable amount of sulfur when suitably bonded in accordance with the preferred embodiment of the present invention results in a definite improvement in this deposit-induced phenomenon. In view of the foregoing, therefore, the apparent conclusion to be reached is that the chemical bonds between the two elements making up the preferred adjuvant of this invention in some currently unexplainable manner produces enhanced effectiveness with regard to deposit-induced engine phenomena without resulting in secondary deleterious problems normally attributed to the presence of each of the elements when used separately or as mixtures of individual phosphorus and sulfur-containing compounds.

As indicated hereinbefore, an additional important advantage obtained from practicing the instant invention is the fact that my organolead adjuvants have little or no antagonistic effect upon the antiknock agent used in the fuel. In line with the enhanced effectiveness of my organolead adjuvants, this surprising benefit regarding a minimum of organolead destructiveness is perhaps associated with the degree of oxidative stability inherent in phosphorus sesquichalcogens. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compound exerts its beneficial antiknock activity.

By the use of the diverse improved organolead-containing compositions of this invention other beneficial effects are obtained. For example, when operating an internal combustion engine on improved fuel of this invention, a marked suppression of spark plug fouling results. As in the case of the obviation of other deposit-induced problems, it is preferred to utilize the adjuvants of this invention in high octane quality fuel because of the fact that most of these problems exist on combustion of such fuel.

Because of their adaptability, the adjuvants of the present invention can be successfully utilized with any of the wellknown organolead antiknock agents as indicated hereinbefore. Likewise, insofar as the halide scavengers are concerned, phosphorus sesquichalcogens can be employed in antiknock fluids and fuels containing such materials as ethylene dibromide, ethylene dichloride, mixed dibromotoluenes, trichlorobenzenes, and in general such organic halide scavengers as those disclosed in U. S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other motor fuel additives such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An organolead antiknock composition adapted for use as an additive for hydrocarbons of the gasoline boiling range containing a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

2. A lead alkyl antiknock composition adapted for use as an additive for hydrocarbons of the gasoline boiling range containing a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

3. A tetraethyllead antiknock composition adapted for use as an additive for hydrocarbons of the gasoline boiling range containing a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

4. A tetraethyllead antiknock composition adapted for use as an additive for hydrocarbons of the gasoline boiling range containing phosphorus sesquisulfide in amount such that the phosphorus-to-lead atom ratio is from about 0.01 to 3 and about 1 to 3.

5. An organolead composition adapted for use as an additive for hydrocarbons of the gasoline boiling range containing a scavenging amount of organic halide material capable of reacting with the lead during combustion in a spark ignition internal combustion engine to form volatile lead halide, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

6. A lead alkyl antiknock composition adapted for use as an additive for hydrocarbons of the gasoline boiling range containing a scavenging amount of organic halide material capable of reacting with the lead during combustion in a spark ignition internal combustion engine to form volatile lead halide, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

7. A tetraethyllead antiknock composition adapted for use as an additive for hydrocarbons of the gasoline boiling range containing a scavenging amount of organic halide material capable of reacting with the lead during combustion in a spark ignition internal combustion engine to form volatile lead halide, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

8. A tetraethyllead antiknock composition adapted for use as an additive for hydrocarbons of the gasoline boiling range containing about 0.5 theory of bromine as an organic bromine compound capable of reacting with the lead during combustion in a spark ignition internal combustion engine to form a volatile lead bromide, about 1.0 theory of chlorine as an organic chlorine compound capable of reacting with the lead during combustion in a spark ignition internal combustion engine to form a volatile lead chloride, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

9. A tetraethyllead antiknock composition adapted for use as an additive for hydrocarbons of the gasoline boiling range containing about 0.5 theory of bromine as ethylene dibromide, about 1.0 theory of chlorine as ethylene dichloride, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

10. A tetraethyllead antiknock composition adapted for use as an additive for hydrocarbons of the gasoline boiling range containing about 0.5 theory of bromine as ethylene dibromide, about 1.0 theory of chlorine as ethylene dichloride, and phosphorus sesquisulfide present in amount such that the phosphorus-to-lead atom ratio is from about 0.01 to 3, and about 1 to 3.

11. Leaded hydrocarbon fuel of the gasoline boiling range in which the lead content is up to about 6.34 grams of lead per gallon containing a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

12. Leaded hydrocarbon fuel of the gasoline boiling range in which the lead content is up to about 6.34 grams of lead per gallon containing a scavenging amount of organic halide material capable of reacting with the lead during combustion in a spark ignition internal combustion engine to form volatile lead halide, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

13. Leaded hydrocarbon fuel of the gasoline boiling range in which the lead content is up to about 6.34 grams of lead per gallon as a lead alkyl containing a scavenging amount of organic halide material capable of reacting with the lead during combustion in a spark ignition internal combustion engine to form volatile lead halide, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

14. Leaded hydrocarbon fuel of the gasoline boiling range in which the lead content is up to about 6.34 grams of lead per gallon as tetraethyllead containing a scavenging amount of organic halide material capable of reacting with the lead during combustion in a spark ignition internal combustion engine to form volatile lead halide, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

15. Leaded hydrocarbon fuel of the gasoline boiling range in which the lead content is up to about 6.34 grams of lead per gallon as tetraethyllead containing about 0.5 theory of bromine as an organic bromine compound capable of reacting with the lead during combustion in a spark ignition internal combustion engine to form a volatile lead bromide, about 1.0 theory of chlorine as an organic chlorine compound capable of reacting with the lead during combustion in a spark ignition internal combustion engine to form a volatile lead chloride, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

16. Leaded hydrocarbon fuel of the gasoline boiling range in which the lead content is up to about 6.34 grams of lead per gallon as tetraethyllead containing about 0.5 theory of bromine as ethylene dibromide, about 1.0 theory of chlorine as ethylene dichloride, and a compound having the general formula:

$$P_4A_3$$

wherein A is selected from the group consisting of sulfur, selenium, and tellurium, said compound being present in amount such that the phosphorus-to-lead atom ratio is from about 0.01 to 3 and about 1 to 3.

17. Leaded hydrocarbon fuel of the gasoline boiling range in which the lead content is up to about 6.34 grams of lead per gallon as tetraethyllead containing about 0.5 theory of bromine as ethylene dibromide, about 1.0 theory of chlorine as ethylene dichloride, and phosphorus sesquisulfide present in amount such that the phosphorus-to-lead atom ratio is from about 0.01 to 3 and about 1 to 3.

References Cited in the file of this patent
UNITED STATES PATENTS
2,405,560    Campbell _____ Aug. 13, 1946